US007923941B2

(12) United States Patent
Chen et al.

(10) Patent No.: US 7,923,941 B2
(45) Date of Patent: Apr. 12, 2011

(54) LOW COST COMPACT SIZE SINGLE STAGE HIGH POWER FACTOR CIRCUIT FOR DISCHARGE LAMPS

(75) Inventors: Timothy Chen, Aurora, OH (US); Virgil A. Chichernea, Mentor, OH (US); James K. Skully, Willoughby, OH (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 12/252,888

(22) Filed: Oct. 16, 2008

(65) Prior Publication Data

US 2010/0097000 A1 Apr. 22, 2010

(51) Int. Cl.
*H05B 41/36* (2006.01)
*H02M 7/06* (2006.01)

(52) U.S. Cl. .................... 315/294; 315/224; 315/200 R; 315/201

(58) Field of Classification Search .................. 315/294, 315/201, 126, 200 R, 224; 363/37
See application file for complete search history.

(56) References Cited

U.S. PATENT DOCUMENTS

| | | | | |
|---|---|---|---|---|
| 4,782,268 | A | 11/1988 | Fahnrich et al. | |
| 5,426,344 | A | 6/1995 | Wong et al. | |
| 5,691,606 | A | 11/1997 | Moisin et al. | |
| 5,898,278 | A * | 4/1999 | Muessli | 315/209 R |
| 5,955,841 | A | 9/1999 | Moisin et al. | |
| 5,982,107 | A * | 11/1999 | Muessli | 315/209 R |
| 5,994,847 | A * | 11/1999 | Konopka | 315/209 R |
| 6,169,274 | B1 | 1/2001 | Chang | |
| 6,348,767 | B1 | 2/2002 | Chen et al. | |

FOREIGN PATENT DOCUMENTS

EP 0 697 803 A2 2/1996

OTHER PUBLICATIONS

PCT/US2009/056891 Search Report, mailed Dec. 2, 2009.

* cited by examiner

*Primary Examiner* — Daniel D Chang
(74) *Attorney, Agent, or Firm* — Fay Sharpe LLP

(57) ABSTRACT

The present application claims a compact low cost topology solution of a ballast for a discharge lamp that can provide both high power factor and low total harmonic distortion with fewer components than prior art. The topology provides the feature of a low crest factor and quick start that increase both the lamp life and the number of starts for the product. By using Bipolar Junction Transistor instead of Field Effect Transistor as the main switches and also a lower value electrolytic, the cost and size are considerably reduced.

20 Claims, 4 Drawing Sheets

LOW COST COMPACT SIZE SINGLE STAGE HIGH POWER FACTOR CIRCUIT FOR DISCHARGE LAMPS

BACKGROUND OF THE DISCLOSURE

The present application is directed to electronic lighting systems, and more particularly to an integrated bridge inverter circuit used in connection with a discharge lamp.

Existing single-stage high-power factor electronic ballasts designed for discharge lamps, such as integral compact fluorescent lamp applications, have various drawbacks including an undesirably limited zero-voltage switching range, a high unnecessary component stress during operation and starting. Existing systems also have undesirably high crest factors and high harmonics' content, which prevents products from compliance with International Electro-technical Commission (e.g., IEC-61000-3-2) standards. Such lamps are also bulky and limit its usage in space sensitive applications.

One existing electronic ballast which may be used for discharge lamps is a self-oscillating high-power factor electronic ballast as taught by Wong, U.S. Pat. No. 5,426,344. The Wong circuit, and other ballasts in the art, use input bridge circuit portions and inverter circuit portions which are distinct and separate from each other. The Wong approach produces a crest factor of 2.0 or higher. The crest factor, alternately referred to as peak-to-RMS (Root Mean Square) ratio is a measurement of a waveform, calculated from the peak amplitude of the waveform divided by the RMS value of the waveform. Crest factor is a parameter that has direct impact on a lamp's life.

A disadvantage of the Wong approach is it produces a high bus-voltage stresses, such as the voltage across a capacitor, which requires use of high voltage-rated transistors. A further disadvantage of the Wong approach is it requires a large EMI filter to moderate the discontinuous nature of the input current existing prior to the input diode bridge. The high-peak currents, which have higher high frequency current content, need to be filtered out by the input EMI filter. A further disadvantage of existing ballasts such as Wong et al., is a high current stress on the switch transistors and resonant components.

Another related patent is Chen, U.S. Pat. No. 6,417,631 by the same first inventor. This topology has eliminated many prior single stage power factor correction (PFC) circuit drawbacks, however, it still uses a larger number of components than a conventional compact fluorescent lamp (CFL), and requires the use of more expensive FET switches.

SUMMARY OF THE DISCLOSURE

The present application overcomes the shortcomings of existing prior art.

An advantage resides in employing a circuit which uses fewer components such as a capacitors, inductors, diodes, and uses less expensive Bipolar Junction Transistors instead of field effect transistor (FET), and thus also has a low cost to produce and to operate.

An advantage resides in the circuit having a combination of a high power factor, a low total harmonic distortion, low crest factor and an extended zero-voltage switching range.

A still further advantage resides in a low component stress on the parts during the starting and operating of the light unit, resulting in longer life of the ballast.

A still further advantage is that the design is extremely compact.

Still other features and benefits of the present disclosure will become apparent from reading and understanding the following detailed description.

DETAILED DESCRIPTION OF THE PREFERRED EMBODIMENTS

Figure 1:
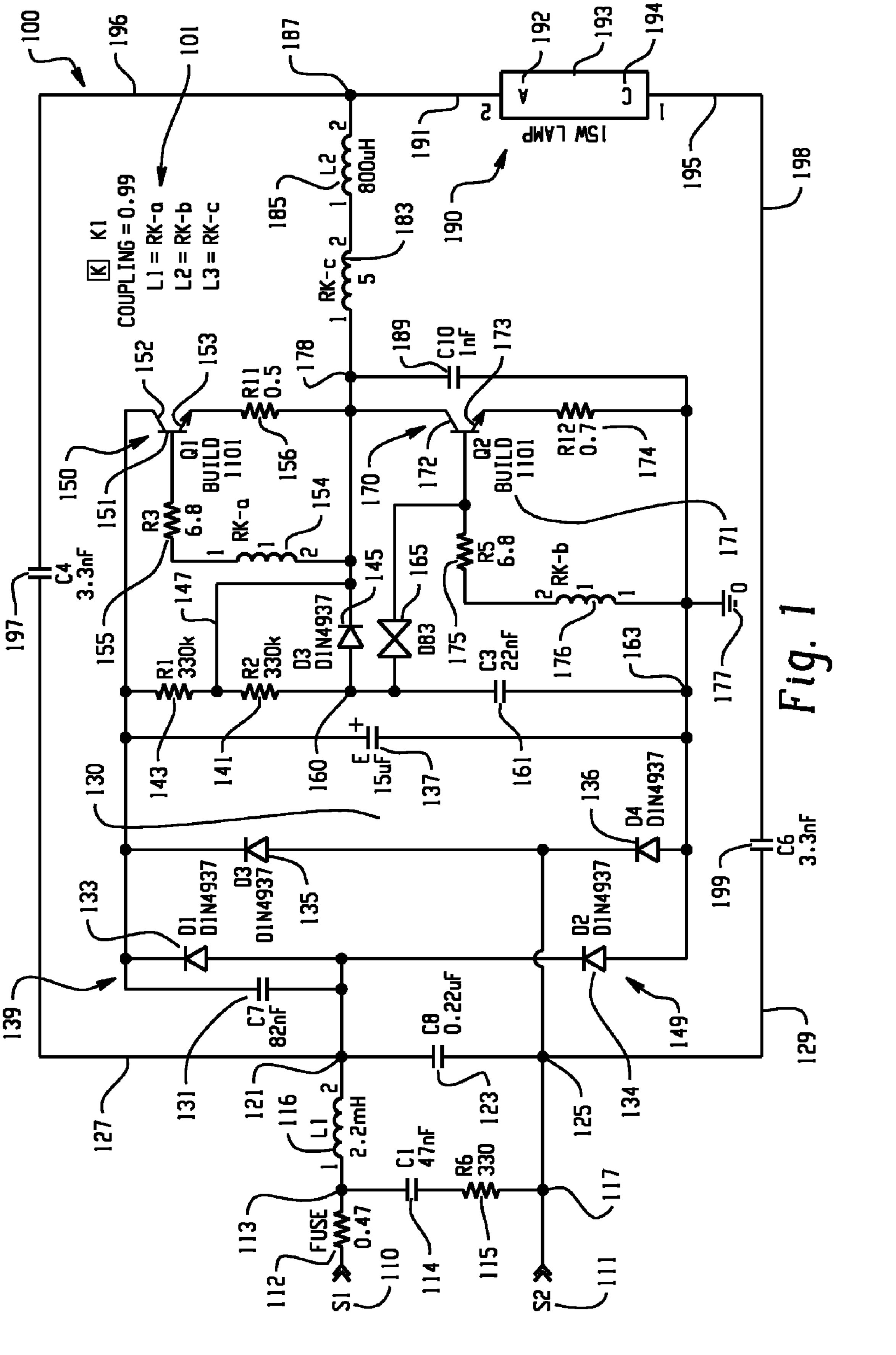
FIG. 1 is an illustration of a schematic circuit diagram of an embodiment of the present application.

With reference to FIG. 1, a schematic circuit 100 of one embodiment of the present application is presented. The legend 101 to the circuit 100 is also presented. The circuit 100 comprises an AC power source 110 located next to a fuse 112 that leads into a junction 113. One branch of the junction leads to a filter and the other branch goes to an EMI inductor 116 followed by a junction 121. The filter is comprised of a capacitor 114 and a resistor 115 in series, and is followed by another junction 117 that leads to the other terminal 111 of the power source and a second branch which leads to another terminal 125. Both terminals 121 and 125 are on opposite ends of a capacitor 123. In an alternative embodiment, it is possible for line 129 to be wired directly to point 121. In an alternative embodiment, it is possible for the line 127 to be wired directly to point 125.

The inductor 116 side junction 121 connects to an outer loop line 127 that leads to a capacitor 197. This junction also connects to the capacitor 123, to another capacitor 131, and to the middle of one side of a four-diode bridge 130, between the diode 133 and the other diode 134. Capacitor 131 and diode 133 both connect to inner loop 139, while diode 134 is connected to inner loop 149. In an alternative embodiment, capacitor 131 may be moved to other points in the circuit such as but not limited to be in parallel with diode 133, 134 or, diode 135 and 136 and the like. In an alternative embodiment, there could be no capacitor or more than one capacitor connected in parallel with diodes 133, 134, 135 and 136.

In an alternative embodiment, the diodes 133, 134, 135, 136 may be collectively or individually removed and replaced by a pair of ultrafast recovery diodes, wherein an ultrafast diode has similar specifications to a regular diode, but has a 25 nanosecond or faster recovery. In still further embodiment, the diodes 133, 134, 135, 136 can be integrated in one package.

The non-inductor side junction 125 is connected to the capacitor 123 and an outer loop 129, which leads to a capacitor 199. In an alternative embodiment, the lamp 193 is connected to junction 125 since the capacitor 199 and lamp 193 are connected in series. The junction 125 is also connected to the middle of the other side of a four-diode bridge 130, between the diode 135 and the other diode 136. Capacitor 131 and diode 135 are both connected to inner loop 139. Diode 136 is connected to inner loop 149.

Both inner loop 139 and 149 connect to opposite ends of an energy storage capacitor 137 and connect to a second common line 163. The portion of the common line 163 closest to inner loop 139 contains two resistors 141, 143 in series followed in series by a line 160 which lies between the inner loop 139 and 149. A line 147 is connected between the resistor 143 and the resistor 141. This line 147 connects to the central line 160. The central line 160 contains a diode 145 between the resistor 141 and the line 147.

The central line 160 continues on and connects to a winding 154, that is electrically coupled to an inductor 183, a resistor 155 and the base terminal 151 of a transistor 150. The transistor 150 is comprised of the B or base terminal 151, the C or collector terminal 152, and the E or emitter terminal 153. The central line 160 also connects to another resistor 156 and the E or emitter terminal 153 of the transistor 150. The collector terminal 152 of this transistor 150 connects to the inner loop 139.

On the opposite side of the central line 160, connected to the same line as the resistors 141, 143 a line connects a diac (diode for alternating current) 165 to a capacitor 161. The other side of the capacitor is connected to the inner loop 149. After the diac, a line connects the diac diode to a junction, with one side of the junction connected to a resistor 175 and a winding 176 also electrically coupled to an inductor 183, connects to the inner line 149 and to circuit ground 177. The other side of the junction is connected to the base terminal 171 of a second transistor 170. The second transistor 170 is comprised of the base terminal 171, the collector terminal 172, and the emitter terminal 173. The central line 160 also connects to another resistor 156 and the emitter terminal 153 of the transistor 150. The collector terminal 172 of the transistor 170 is connected to the central line 160 and the emitter terminal 173 of the transistor 170 is connected to a resistor 174, which is then connected to the inner loop 149. The inner loop 149 connects to a capacitor 189 and to the central line 160 at a junction point 178.

The two inductors 183, 185 are connected in series and one side connects to the junction point 178 and the other connects to the portion 187 of the outer loop bridge 196 that follow the capacitor 197. The junction 187 is also connected to a lamp 190, by way of a line 191 to the A terminal 192 of the lamp 193. The C terminal 194 of the lamp 193 assembly is connected by another line 195 to the portion of the inner loop 198 that follows the capacitor 199. In an alternative embodiment, the junction 187 is connected to the capacitor 199 and then to the lamp 193, because the capacitor 199 and lamp 193 are connected in series.

The four-diode bridge only conducts one at a time at the switching frequencies of the inverter circuit when it is not on the peak changing. The diodes 133 and 136 are alternately on and off during one half cycle, while diodes 134 and 135 are on during the other half of the cycle of the line cycle. The capacitor 197 also serves to provide the high frequency feedback. Similarly the capacitor 199 also forces the diode to operate at high frequencies due to feedback.

With the new topology, in the circuit arrangement, the Rk-a and Rk-b circuit's base drivers 154 and 176 are derived from inserting the Rk-c primary winding 183 in series with the input of the resonant tank circuit. A tank circuit, also called a resonant circuit, provides the energy to start and operate the lamp. The two secondary windings, Rk-a 154, and Rk-b 176, in opposite phase, are connected to the driver of the two Bipolar Junction Transistor bases. The two Bipolar Junction Transistors are connected in series and in half bridge configuration. In this configuration, the primary winding not only senses the lamp's current, but also the resonant current from capacitor 197. Since both the branch of the circuit 197 and the lamp 199 are connected to the input bridge, the line voltage modulates the effective capacitor values for the capacitors 197 and 199. As the instantaneous line voltage varies, the effective capacitor for capacitors 197 and 199 vary with it. Therefore, the current to the input of the resonant tank changes. The base drivers that sense from the input current to the resonant tank amplifies differences over a half line cycle, as a result the crest factor of the lamp is higher in the range of 1.8 to 2.0 which has negative impact on lamp life. In addition, with large variation of the operating frequency over the half line cycle, it is difficult to maintain zero voltage switching of the Bipolar Junction Transistors and consequently the temperature of the parts are high and life of the product is low.

The other drawback of this drive arrangement is that as a lamp approaches end of life, the cathode may overheat and the cathode would open. However, the inverter will continue to provide the energy to the lamp and generate an even higher temperature around the cathode.

The high frequency operation of the input bridge circuit performs at over 20,000 hertz. The high frequency circuit produces a low total harmonic distortion, also called THD, and high power factor. Unlike a conventional design, this design also will provide the advantage of having a smaller integral lamp profile that will fit in most existing fixtures. The existing high power factor ballasts include a separate power factor correction stage, with additional components, that result in larger complexity, higher price and larger size for the circuit.

This circuit design may also use a small value electrolytic that may assure the continuous lamp current conduction, so the unwanted lamp turn-off phenomena is avoided at each cycle that can significantly affect the lamp life. The value of the electrolytic capacitor is sized just big enough to accomplish this feature, but not too big which can hurt the size and cost. The use of Bipolar Junction Transistor switches 150 with the driver circuit, will give a low cost solution for the overall design. This design provides better performance such as high PF and low THD than do existing ballasts approaches, and contains fewer components which help with the manufacturing process, compact size and lower cost.

The topology has the feature of using fewer components to achieve premium features like high PF and low THD, all in a compact size. This topology is the same size of the overall lamp like an regular, non-power factor corrected, compact fluorescent lamp. In this disclosure two versions of low cost Bipolar Junction Transistors based electronic ballast circuits are presented. In both circuits, the mean operating frequency is designed at about 100 Khz which is much higher than the conventional circuit operated at about 40 Khz for the size consideration of the magnetic and capacitors.

Figure 2:
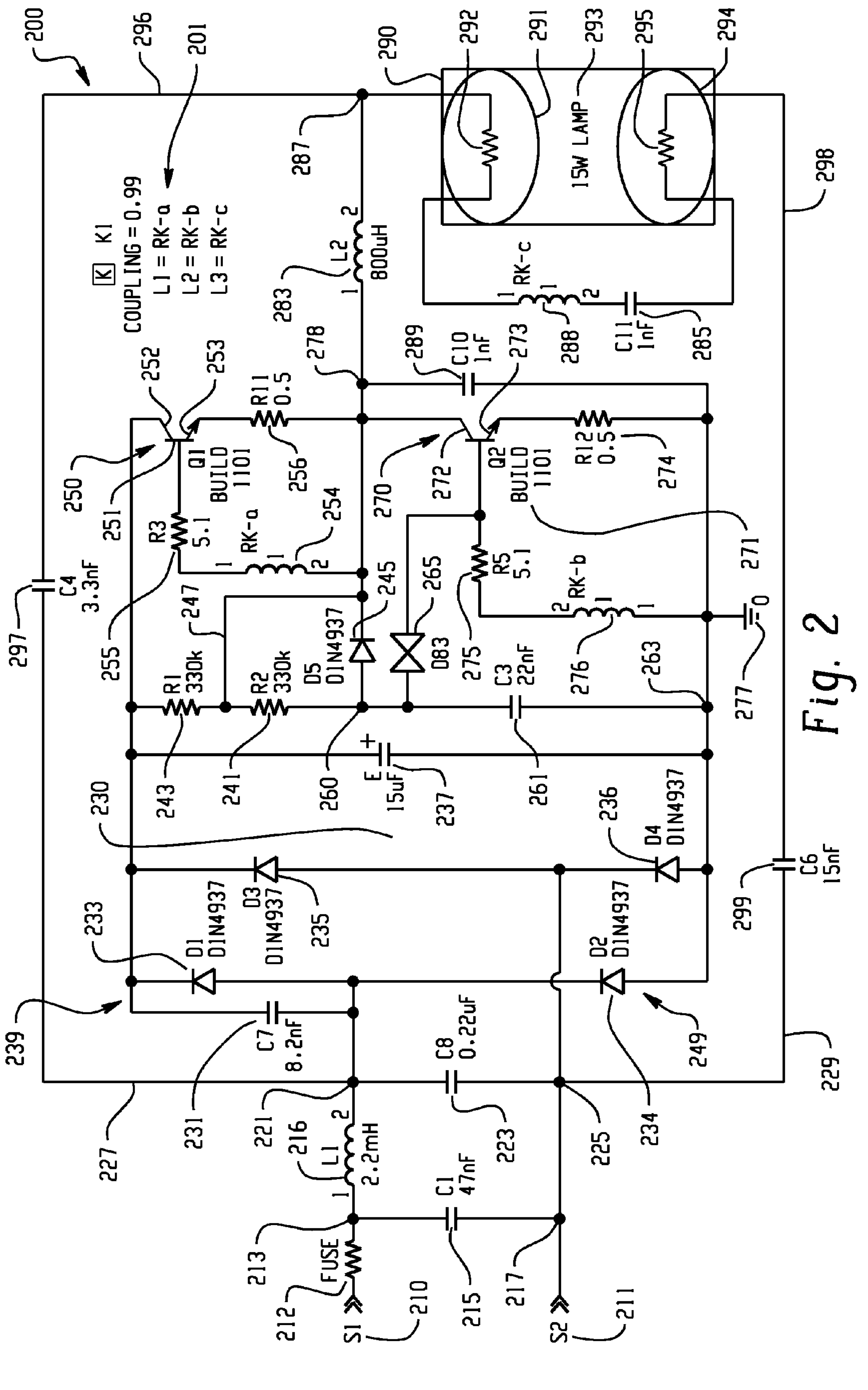
FIG. 2 is an illustration of a schematic circuit diagram of an embodiment of the present application.

With reference to FIG. 2, schematic circuit diagram 200 of one embodiment of the present application is presented. The diagram 200 shows a new improved base drive arrangement for the new inverter circuit. The device 200 comprises an AC power source 210 located next to a fuse 212 that leads into a junction 213. One branch of the junction leads to a capacitor 215 the other followed by a junction 221. The capacitor 215 is followed by another junction 217 that leads to the other terminal power source 211 and a second branch which leads to another terminal 225. Both terminals 221 and 225 are on opposite ends of a capacitor 223. In an alternative embodiment, line 229 may be wired directly to point 221. In an alternative embodiment, the line 227 may be wired directly to point 225.

The inductor 216 side junction 221 connects to an outer loop bridge line 227 that leads to a capacitor 297. This junction also connects to the capacitor 223, to another capacitor 231, and to the middle of one side of a four-diode bridge 230, between the diode 233 and the other diode 234. Capacitor 231 and diode 233 both connect to inner loop 239, while diode 234 is connected to inner loop 249. In an alternative embodiment, capacitor 231 may be moved to other points in the circuit such as but not limited to be in parallel with diode 233, 234 or, diode 235 and 236 and, the like. In an alternative embodiment, there could be no capacitor or more than one capacitor connected in parallel with diodes 133, 234, 235 and 236.

The non-inductor side junction 225 is connected to the capacitor 223 and an outer loop bridge 229, which leads to a capacitor 299. In an alternative embodiment, the lamp 293 is connected to junction 225 since the capacitor 299 and lamp 293 are connected in series. The junction 225 is also connected to the middle of the other side of a four-diode bridge 230, between the diode 235 and the other diode 236. Capacitor 231 and diode 235 are both connected to inner loop 239. Diode 236 is connected to inner loop 249. In an alternative embodiment, capacitor 231 may be moved to other points in the circuit such as but not limited to other lines 227, 229, between diodes 233, 234 or between diodes 235, 236 and the like. In a still further embodiment, the diodes 233, 234, 235, 236 may be collectively or individually removed and replaced by at least one ultrafast diode.

Both inner loops 239 and 249 connect to opposite ends of a capacitor and connect to an central line 260 in between the inner loops 239, 249. The portion of the common line 263 closest to inner loop 239 contains two resistors 241, 243, in series followed in series by a line in between inner loops 239 and 249. Line 247 is connected between the resistor 243 and the resistor 241. This line 247 connects to the central line 200. The central line 260 contains a diode 245 between the resistor 241 and the line 247.

The central line 260 connects to an winding 254, a resistor 255 and the base terminal, 251 of a transistor 250. The transistor 250 is comprised of the base terminal 251, the collector terminal 252, and the emitter terminal 253. The central line 160 also connects to another resistor 256 and the emitter terminal 253 of the transistor 250. The central line 160 also connects to another resistor 256 and the emitter junction 253 of the same transistor 250. The collector terminal 252 of this transistor 250 connects to the inner loop 239.

On the opposite side of the central line 260, connected to the same line as the resistors 241, 243 is connected a line that is connected to a diac 265 and to a capacitor 261. The other side of the capacitor is connected to the inner loop 249. After the diac, a line runs to a junction, with one side of the junction connected to a resistor 275 and winding 276, connects to the inner line 249 and to circuit ground 277. The other side of the junction is connected to the base 271, base of a second transistor 270. This transistor 270 is comprised of the B or base terminal 271, the C or collector terminal 272, and the E or emitter terminal 273. The central line 260 also connects to another resistor 256 and the collector terminal 273 of the transistor 270. The collector terminal 272 of the transistor 270 is connected to the central line 260 and the emitter terminal of the transistor 273 is connected to a resistor 274, which is then connected to the inner loop 249. The inner loop 249 connects to a capacitor 289 and to the central line 260 at a junction point 278.

The central line 260 is connected to an inductor 283 in series which connect to the portion of the outer loop 296 that follow the capacitor 297. The central line 260 is also connected 287 to a lamp unit 290. The lamp unit 290 comprised of a cathode 291 with a filament 292 with a wattage rating 293 such as, but not limited to, 15 Watts. The lamp unit 290 also contains a second cathode 295 comprised of another filament 294. Both filaments 292, 294 are connected together in series with a primary winding 288 and a capacitor 285. The filaments of the second lamp 295 are linked by a line 298 to the bridge 229. In an alternative embodiment, the junction 287 is connected to the capacitor 299 and then to the lamp 293, because the capacitor 299 and lamp 293 are connected in series.

The primary winding Rk-c of the base drive transformer 288 is connected in series with the capacitor 285 and two cathode resistors 292 and 295 and then in parallel with the lamp. Since, lamp voltage changes inversely to the lamp current, hence, the drive current which goes through the primary drive transformer is also inverse to the lamp current. The operating frequency over the half line cycle is also less varied compared to the FIG. 1 circuit because of the negative feedback of the drive characteristic. Therefore, the crest factor of the lamp in the new circuit is substantially lower (1.5 to 1.65). The low crest factor will extend the lamp life. This also provides a more effective means to maintain the zero voltage switching for the Bipolar Junction Transistor, increase the ballast efficiency and low temperature on the switching devices.

Because the primary winding of drive transformer is now inserted in series with the cathodes of the two lamps, in the event of one cathode reaching and lamp life, the circuit will automatically stop operation avoiding overheating of the lamp cathode.

Figure 3:
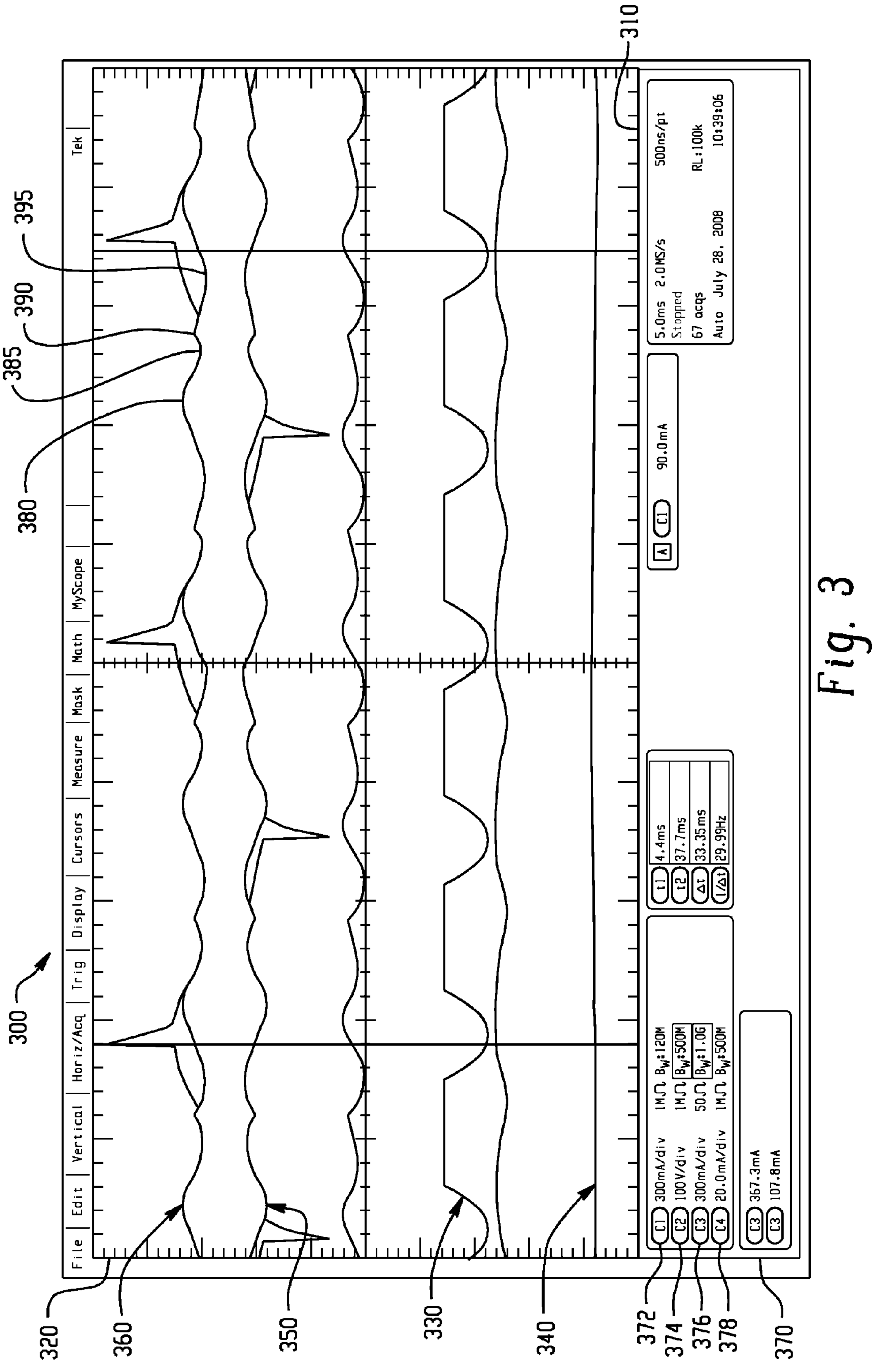
FIG. 3 is a graphical presentation of a useful result of the performance of an embodiment of the present application.

With reference to FIG. 3, the waveform produced by the current application 300 demonstrates the functionality of the circuit presented in FIG. 1. The X-axis 310 represents time in five milli-second increments, while the Y-axis 320 represents the variation in voltage measured in volts and the variation in current measured in amps. The waveforms for the connector to emitter voltage 330, the Bipolar Junction Transistor's corrector current 340, the lamp's current 350 and the input current 360 are each presented.

The legend of the graph 370 contains average values for the respective waveforms. For the connector to emitter voltage 330 as displayed in the graph legend, the value is 300 milliAmps per division 372. For the Bipolar Junction Transistor corrector current 340, the average value is 100 Volts per division 374; for the lamp's current 350, the scale is 300 milliAmps per division 376; and for the input current 360, the scale is 20 milliVolts per division 378. The lamp's current waveform 350 of the lamp has a higher and longer sustained peak 380, followed by a trough 385, followed by a smaller and less sustained shorter peak 390, followed by a deeper trough 395. Here the peak 380 that is longest in duration is also highest in peak.

Figure 4:
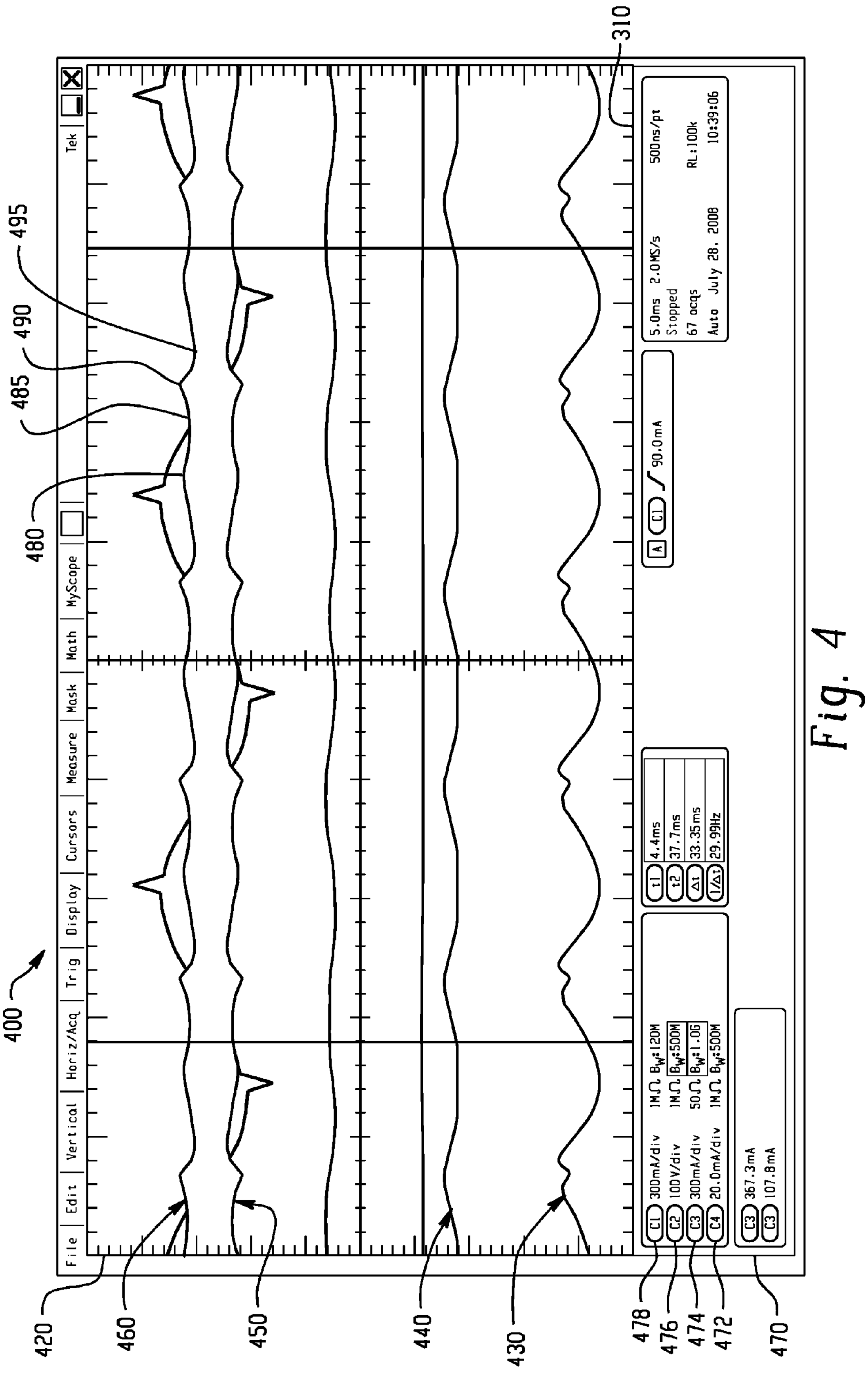
FIG. 4 is a graphical presentation of a useful result of the performance of an embodiment of the present application.

With reference to FIG. 4, the waveform produced by the current application 400 demonstrates the functionality of the circuit presented in FIG. 1. The X-axis 410 represents time in 5 milli-Second increments, while the Y-axis 420 represents the variation in voltage measured in volts and the variation in current measured in amps. The waveforms for the connector to emitter voltage 430, the Bipolar Junction Transistor's corrector current 440, the lamp's current 450 and the input current 360 are each presented.

For the connector to emitter voltage 430 as per the legend on the graph, the value is 300 milliAmps per division 472. For the Bipolar Junction Transistor's corrector current 440, the scale is 100 Volts per division 474; for the lamp's current 450, the scale is 300 milliAmps per division 476; and for the input current 460, the scale is 20 millivolts per division 478. The lamp's current waveform 450 has a small and sustained peak 480, followed by a small trough 485, a higher but less sustained peak 490, and a deep trough 495. Here the peak 480 that is the longest in duration is also the lowest in peak.

A comparison of the lamp current waveform 350 on FIG. 3 with the lamp current waveform 450 in FIG. 4 demonstrates the reduction in crest factor. In FIG. 3, the sustained peak 380 is higher than the short peak 390. In FIG. 4, the sustained peak 480 is lower than the short peak 490. Similarly, in FIG. 3 the deep trough 395 is deeper than the FIG. 4 deep trough 495. The peak being of lower height and the troughs being shallower demonstrates the reduction of the crest factor and also demonstrates a useful, concrete and tangible result of the present application.

The disclosure has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A ballast circuit or driving a discharge lamp, comprising:

a power input operative to receive an AC input signal;

a rectifier comprising a rectifier input including first and second rectifier input terminals coupled with the power input, a rectifier output coupled to first and second terminals of a DC bus, and at least one rectifier diode coupled between the rectifier input and the rectifier output and operative to convert AC power at the rectifier input to provide DC power to the DC bus;

an inverter including first and second Bipolar Junction Transistors (BJTs) coupled in series between the first and second DC bus terminals, the first and second BJTs connected to one another at an inverter central node;

a transformer with a primary winding coupled between the inverter central node and a first lamp connection, and first and second secondary windings;

a driver circuit including the first and second secondary windings of the transformer, the first secondary winding of the transformer being coupled with a base terminal of the first BJT, and the second secondary winding of the transformer being coupled with a base terminal of the second BJT, the driver circuit operative to drive the first and second BJTs in alternating fashion to provide a high frequency AC inverter output signal at the inverter central node;

a first capacitance coupled in series between the first lamp connection and the first rectifier input terminal; and a second capacitance coupled in series between a second lamp connection and the second rectifier input terminal.

2. The ballast circuit of claim 1, where the primary winding senses a lamp current and a resonant current of the first capacitance.

3. The ballast circuit of claim 2, further comprising a third capacitance coupled in parallel across the at least one rectifier diode of the rectifier.

4. The ballast circuit of claim 3, where the at least one rectifier diode comprises an anode connected to the first rectifier input terminal and a cathode connected to the first DC bus terminal, and where the third capacitance is connected between the first rectifier input terminal and the first DC bus terminal.

5. The ballast circuit of claim 4, where the rectifier s a full bridge rectifier comprising four rectifier diodes, where a first rectifier diode comprises an anode connected to the first rectifier input terminal and a cathode connected to the first DC bus terminal, and where the third capacitance is connected between the first rectifier input terminal and the first DC bus terminal.

6. The ballast circuit of claim 1, further comprising a third capacitance coupled in parallel across the at least one rectifier diode of the rectifier.

7. The ballast circuit of claim 6, where the at least one rectifier diode comprises an anode connected to the first rectifier input terminal and a cathode connected to the first DC bus terminal, and where the third capacitance is connected between the first rectifier input terminal and the first DC bus terminal.

8. The ballast circuit of claim 1, where the rectifier is a full bridge rectifier comprising four rectifier diodes, where a first rectifier diode comprises an anode connected to the first rectifier input terminal and a cathode connected to the first DC bus terminal, further comprising a third capacitance is connected in parallel with the first rectifier diode.

9. A ballast circuit for driving a discharge lamp, comprising:

a power input operative to receive an AC input signal;

a rectifier comprising a rectifier input including first and second rectifier input terminals coupled with the power input, a rectifier output coupled to first and second terminals of a DC bus, and at least one rectifier diode coupled between the rectifier input and the rectifier output and operative to convert AC power at the rectifier input to provide DC power to the DC bus;

an inverter including first and second Bipolar Junction Transistors (BJTs) coupled in series between the first and second DC bus terminals, the first and second BJTs connected to one another at an inverter central node;

an inductance coupled between the inverter central node and a first lamp connection;

a transformer with a primary winding coupled between second and third lamp connections, and first and second secondary windings;

a driver circuit including the first and second secondary windings of the transformer, the first secondary winding of the transformer being coupled with a base terminal of the first BJT, and the second secondary winding of the transformer being coupled with a base terminal of the second BJT, the driver circuit operative to drive the first and second BJTs in alternating fashion to provide a high frequency AC inverter output signal at the inverter central node;

a first capacitance coupled in series between the first lamp connection and the first rectifier input terminal; and a second capacitance coupled in series between a fourth lamp connection and the second rectifier input terminal.

10. The ballast circuit of claim 9, further comprising a third capacitance coupled in parallel across the at least one rectifier diode of the rectifier.

11. The ballast circuit of claim 10, where the at least one rectifier diode comprises an anode connected to the first rectifier input terminal and a cathode connected to the first DC bus terminal, and where the third capacitance is connected between the first rectifier input terminal and the first DC bus terminal.

12. The ballast circuit of claim 11, where the primary winding is connected in series with both filaments of a connected lamp.

13. The ballast circuit of claim 11, where the rectifier is a full bridge rectifier comprising four rectifier diodes, where a first rectifier diode comprises an anode connected to the first rectifier input terminal and a cathode connected to the first DC bus terminal, and where the third capacitance is connected between the first rectifier input terminal and the first DC bus terminal.

14. The ballast circuit of claim 10, where the primary winding is connected in series with both filaments of a connected lamp.

15. The ballast circuit of claim 14, where the rectifier is a full bridge rectifier comprising four rectifier diodes, where a first rectifier diode comprises an anode connected to the first rectifier input terminal and a cathode connected to the first DC bus terminal, and where the third capacitance is connected between the first rectifier input terminal and the first DC bus terminal.

16. The ballast circuit of claim 10, where the rectifier is a full bridge rectifier comprising four rectifier diodes, where a first rectifier diode comprises an anode connected to the first rectifier input terminal and a cathode connected to the first DC bus terminal, and where the third capacitance is connected between the first rectifier input terminal and the first DC bus terminal.

17. The ballast circuit of claim 9, where the rectifier is a full bridge rectifier comprising four rectifier diodes, where a first rectifier diode comprises an anode connected to the first rectifier input terminal and a cathode connected to the first DC bus terminal, further comprising a third capacitance is connected in parallel with the first rectifier diode.

18. The ballast circuit of claim 17, where the primary winding is connected in series with both filaments of a connected lamp.

19. The ballast circuit of claim 9, where the primary winding is connected in series with both filaments of a connected lamp.

20. A ballast circuit for driving a discharge lamp, comprising:

a power input operative to receive an AC input signal;

a rectifier comprising a rectifier input including first and second rectifier input terminals coupled with the power input, a rectifier output coupled to first and second terminals of a DC bus, and at least one rectifier diode coupled between the rectifier input and the rectifier output and operative to convert AC power at the rectifier input to provide DC power to the DC bus;

an inverter including first and second Bipolar Junction Transistors (BJTs) coupled in series between the first and second DC bus terminals, the first and second BJTs connected to one another at an inverter central node, the inverter central node coupled with a first lamp connection;

a driver circuit operative to drive the first and second BJT's in alternating fashion to provide a high frequency AC inverter output signal at the inverter central node;

a first capacitance directly connected in series between the first lamp connection and the first rectifier input terminal; and a second capacitance directly connected in series between a fourth lamp connection and the second rectifier input terminal.

* * * * *